United States Patent [19]

Krieg

[11] Patent Number: 5,324,802
[45] Date of Patent: Jun. 28, 1994

[54] METHOD FOR BULK POLYMERIZING METHYL METHACRYLATE

[75] Inventor: Manfred Krieg, Darmstadt, Fed. Rep. of Germany

[73] Assignee: Röhm GmbH, Darmstadt, Fed. Rep. of Germany

[21] Appl. No.: 81,062

[22] Filed: Jun. 22, 1993

Related U.S. Application Data

[63] Continuation of Ser. No. 889,151, May 27, 1992, abandoned.

[30] Foreign Application Priority Data

Jun. 20, 1991 [DE] Fed. Rep. of Germany ....... 4120317

[51] Int. Cl.$^5$ .................................. C08F 4/04
[52] U.S. Cl. ................. 526/218.1; 526/219; 526/329.7
[58] Field of Search .............. 526/218.1, 219

[56] References Cited

U.S. PATENT DOCUMENTS

| 2,439,528 | 4/1948 | Roedel | 526/218.1 |
| 2,471,959 | 5/1949 | Hunt | 260/89.5 |
| 2,520,339 | 8/1950 | Robertson | 260/80 |
| 3,113,114 | 12/1963 | Maginn et al. | 252/426 |
| 3,306,888 | 2/1967 | Mortimer | 260/94.9 |
| 3,424,734 | 1/1969 | Schleimer et al. | 526/218.1 |
| 4,296,214 | 10/1981 | Kamada et al. | 526/218.1 |
| 4,937,175 | 6/1990 | White et al. | 526/218.1 |

FOREIGN PATENT DOCUMENTS

| 1495692 | 5/1973 | Fed. Rep. of Germany | 526/218.1 |
| 2254572 | 5/1974 | Fed. Rep. of Germany | . |
| 2630996 | 1/1978 | Fed. Rep. of Germany | . |
| 2167375 | 6/1990 | Japan | 526/219 |
| 1044956 | 10/1966 | United Kingdom | 526/219 |
| 1590173 | 5/1981 | United Kingdom | . |

OTHER PUBLICATIONS

Puntigam/Völker, Acryl- und Methacrylverbindungen, Springer-Verlag 1967, p. 376.
Viewig/Esser, Kunstoff Handbuch, Carl Hanser Verlag 1975, p. 27.
Ullmann's Encyclopedia of Industrial Chemistry, vol. A21, VCH 1990, p. 319.
Allen and Bevington, Comprehensive Polymer Science, vol. e, Pergamon Press, Oxford 1989, p. 176.
Mark et al., Encyclopedia of Polymer Science and Engineering, vol. 3, Wiley-Interscience 1985, pp. 278–279.
Encyclopedia of Polymer Science and Technology, 2nd Edition, vol. 2, pp. 154, 155.

Primary Examiner—Joseph L. Schofer
Assistant Examiner—N. Sarofim

[57] ABSTRACT

What is disclosed is an improved method for making substantially colorless polymethyl methacrylate by bulk polymerizing methyl methacrylate with an initiator which is an azo compound free of nitrile groups.

5 Claims, No Drawings

METHOD FOR BULK POLYMERIZING METHYL METHACRYLATE

This is a continuation of Ser. No. 889,151 filed on May 27, 1992 now abandoned.

The present invention relates to an improved method for preparing polymethyl methacrylate by bulk polymerization, particularly in a chamber process, with suppression of yellowing. More in particular, the method employs an azo compound, free of nitrile groups, as the initiator.

STATE OF THE ART

From the beginning, polymethyl methacrylate (PMMA), which is a thermoplastic synthetic resin, has been particularly valued for having the properties that otherwise were known only in mineral glass, namely absolute clarity, transparency, and colorlessness. In pure PMMA, the natural spectral modulus of extinction, K, is less than $1 \times 10^{-4}$ mm$^{-1}$. It can be concluded from light-absorption measurements on PMMA that the light absorption is not only determined by the material itself, but is also strongly influenced by additives, impurities, and decomposition products present as traces and in varying amounts. (Cf. Vieweg-Esser, *Kunststoff Handbuch*, vol. IX, p. 196, Carl Hauser Verlag, 1975.) From this and other literature sources it is also known to influence the polymerization method and also, to a certain degree, the quality of the polymerized product, by the choice of certain method parameters. Whereas in earlier years, benzoyl peroxide was used exclusively as an initiator, other peroxidic initiators were later used, e.g. aliphatic diacyl peroxides, peresters, and percarbonates, or azoisobutyronitrile. (Cf. Vieweg-Esser, op.-cit., p. 17; U.S. Pat. No. 3,113,114, incorporated herein by reference; U.S. Pat. No. 2,471,959, incorporated herein by reference.) In the last-mentioned patent, various disadvantages which could arise with the use of peroxidic initiators are indicated, e.g. coloration and crosslinking of the polymer formed as a result of oxidation processes. Instead, U.S. Pat. No. 2,471,959 recommends the use of azo initiators, whereby particularly the colorlessness of the products so obtained is emphasized. At the same time, the possibility of using azo initiators in connection with telomerization in polymerization processes, is stressed that is in combination with chain transfer reagents such as the sulfur chain transfer agents. In the review literature, 2,2'-azobisisobutyronitrile (AIBN) is pictured as an initiator which decomposes at 35° C. in nitrogen into two tert.-butylnitrile radicals, which in turn initiate the polymerization of the monomers and are finally incorporated into the macromolecule. It is noted that the cyanoisopropyl end groups from the AIBN are relatively more stable than the end groups derived from peroxy compounds, such as the benzoyl group. (Cf. Rauch-Puntigam, Th. Völker, *Acryl- und Methacrylverbindungen*, p. 163, Springer Verlag, 1967.)

PROBLEM AND SOLUTION

In the practical performance of the bulk polymerization of methyl methacrylate, optionally together with further comonomers other than methyl methacrylate, e.g. $C_1$-$C_4$-alkyl esters of (meth)acrylic acid, (meth)acrylic acid, (meth)acrylamide, inter alia, and/or, for example, crosslinking monomers in amounts below 10 percent by weight, problems frequently occur which cannot be logically explained in terms of the state of the art. First, it is observed that when the generally preferred AIBN, as well also as 2,2'-azobis-(2,4-dimethylvaleronitrile) is used, very strong yellow coloration occurs, whereas if peroxidic initiators are used the coloration decreases to a tolerable amount. In the review literature, a connection between the use of benzoyl peroxide and coloration in the preparation of PMMA and later yellowing is given. (Cf. C.E. Schildknecht, *Polymerization Processes*, Wiley-Interscience, p. 40.) Peroxidic initiators, further, have the great disadvantage that they favor boundary layer reactions and, thus, in part lead to massive surface defects so that their use also does not lead to a fully satisfactory solution. Thus, the problem exists of modifying the technical conditions of the bulk polymerization of methyl methacrylate, particularly using a chamber process, so that the most colorless product possible is formed, which product, however, also satisfies technical requirements in the remaining spectrum of properties.

The search for the causes of coloration under the influence of azo initiators must necessarily focus on other additives, impurities, and decomposition products which, according to the predictions in the Kunststoff Handbuch, loc.cit., influence light absorption. In the polymerization method in question, in addition to the initiator, auxiliaries or additives, or other components are, in particular, release agents such as phosphoric acid esters like di-2-ethylhexyl phosphate, and crosslinking agents such as triallyl cyanurate. In the interest of producing a flawless, saleable product, such additives for the bulk polymerization of methyl methacrylate can hardly be avoided in practise at the present time. The problem to be solved becomes apparent in cases when two representative additives, namely di-2-ethylhexyl phosphate as a release agent and of triallyl cyanurate as a crosslinker are present. To the extent that one of the two substances, or both substances in combination, are responsible for the strong yellowing which is observed- and the fact that di-2-ethylhexyl phosphate also leads to yellowing in adhesives suggests this-, no direct practicable way to avoid coloration seems to present itself if one does not wish to accept an accompanying deterioration in general product quality. Further, from the outset, a possible influence of acidic or basic agents, which might be present in the form of (meth)acrylic acid or aminoalkyl (meth)acrylates, for example, cannot be ignored.

It has now been found that extensively colorless polymethyl methacrylate, the remaining spectrum of properties of which is completely satisfactory, can be prepared according to the present invention under the conditions of bulk polymerization, particularly in a chamber process (as a so-called "cast material") even in the presence of conventional release agents such as di-2-ethylhexyl phosphate and of crosslinkers such as triallyl cyanurate.

Thus, the present invention relates to a method for making extensively colorless polymethyl methacrylate under the conditions of bulk polymerization in the presence of an azo compound as the polymerization initiator and, optionally, in the presence of acidic or basic agents, and optionally in the presence of crosslinking materials such as triallyl cyanurate and of parting agents such as di-2-ethylhexyl phosphate, wherein, as initiators, azo initiators, free of nitrile groups, and particularly those having a half life of ten hours in the region 65°±15° C. (10 h t$_\frac{1}{2}$° C.) are employed. (Cf. H. F. Mark et al., *Ency-*

*clopedia of Polymer Science and Technology,* 2nd edition, vol. 11, p. 2, J. Wiley & Sons).

The rate of decomposition of azo initiators can be determined according to C. G. Overberger et al., J. Am. Chem. Soc. 71, 2661 (1949). 45 ml of toluene are introduced into a 50 ml two-necked round-bottomed flask fitted with an inlet tube for bubbling purified nitrogen through the toluene solvent and a capillary tube outlet to a water-jacketed gas burette. A 3-way stopcock in the line to the burette vents nitrogen used for a preliminary flushing. The reaction vessel is immersed in a constant-temperature bath controlled to 0.1° C. The solvent is deoxygenated with a slow stream of nitrogen for a period of thirty minutes and then allowed to reach thermal equilibrium with the bath. A solid azo compound is next introduced into the reaction vessel in an amount to give a 0.1N solution by momentary removal of the ground glass neck bearing the nitrogen inlet. The flask is then swirled to effect solution and thorough mixing.

Timing begins with the first introduction of the azo compound. The volume (V) of nitrogen evolved is measured with the gas burette at time intervals varying with the rate of the reaction being followed. Volume readings obtained after 24 hours are treated as V-values. The natural logarithms of the ratios $V/V - V_t$ are calculated and plotted on the ordinate versus time on the abscissa. The slopes or the best straight line through the points so plotted are measured and are the rate constants.

In particular, these are azo initiators, used in an amount sufficient for initiation, of the formula (I)

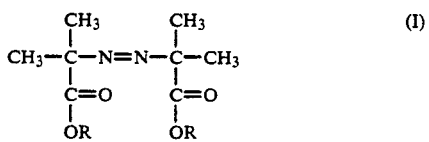

wherein R stands for an alkyl group having 1 to 8 carbon atoms, particularly a methyl or ethyl group, as well as hydroxylated derivatives thereof such as di-(2-hydroxyethyl)-2,2'-azo-bisisobutyrate, di-(2-hydroxypropyl)-2,2'-azo-bis isobutyrate, and, further, azocumene derivatives such as 1,1'-azo-bis-4-methylcumene and 1,1'-azo-bis-4-isopropylcumene.

Generally, these azo initiators are used in amounts from 0.01 to 0.5 percent, particularly 0.02 to 0.2 percent, by weight of the monomers. The aforementioned acidic or basic agents can be present in the polymerization batch in the form of acidic or basic monomers, but they can also find entry into the batch in the form of polymerization auxiliaries or other additives. The method according to the invention is particularly useful in just those cases where an acid or base catalysis is possible.

Performance of the method of the invention can follow in direct reference to the state of the art. (Cf. Ullmanns *Encyclopadie der technischen Chemie,* 4th edition, vol. 19, pp. 22-23, Verlag Chemie; Rauch-Puntigam, Th. Völker, *Acryl- und Methacrylverbindungen,* pp. 274-280, Springer Verlag, 1967; C. E. Schildknecht, *Polymerization Processes,* loc. cit.; M. B. Horn, *Acrylic Resins,* pp. 37 ff., Reinhold Publishing Co. 1960). Azo initiators which satisfy the aforementioned criteria, and the solvents appropriate thereto, can be found, for example, in the *Polymer Handbook,* Editors J. Brandrup and E. H. Immergut, 3rd edition, part II:/1, J. Wiley.

As a monomer, methyl methacrylate of conventional purity is used in amounts, usually, of 80-100 percent by weight of the total. The usual comonomers for PMMA can be used, e.g. methyl acrylate, ethyl acrylate and ethyl methacrylate, butyl acrylate and methacrylate, ethylhexyl acrylate and methacrylate, phenyl acrylate and methacrylate, acrylamide and methacrylamide, acrylic acid and methacrylic acid, and styrene.

The use of partially polymerized monomers (prepolymers), which can contain about 5 percent by weight of polymer, for example, is especially recommended. The polymerization batches further contain the initiators to be used according to the invention, particularly those of formula (I), as well as, often, crosslinking agents, especially triallyl cyanurate, and release agents, especially di-2-ethylhexyl phosphate, as well as optional plasticizers like phthalic acid esters, stabilizers such as sterically hindered phenols, sterically hindered amines (HALS products, cf. U.S. Pat. No. 4,593,064, incorporated herein by reference), and UV absorbers such as benzotriazoles, for example 2-(2-hydroxy-5-methyl-phenyl)-2H-benzotriazole, inter alia. (Cf. R. Gächter and H. Müller, *Kunststoff-Additive,* Hanser Verlag, 1979).

In the chamber process, molds of silicate glass (e.g. 8 mm float glass) are advantageously used, which are spaced and sealed with a gasket (e.g. a shaped synthetic resin, for example PVC) which runs around the edge. The flat chambers obtained in this way are held together under a certain pressure, e.g. with clamps. The gaskets at the edge must be compressible in order to follow the volume contraction (shrinkage) which occurs during the polymerization, so that there is no separation of the polymer from the glass surface.

As a rule, methyl methacrylate, suitably containing the named auxiliaries, is filled into the still-open fourth side of the mold, which is tightly sealed on three sides and may be evacuated. The polymerization is usually carried on in an arrangement of the chambers which permits temperature control or removal of heat. So, for instance, the chambers, arranged substantially horizontally in frames, can be held under polymerization conditions in a hot air oven with a high air velocity, in autoclaves employing water sprays, or in waterfilled tanks. Polymerization is initiated by heating. For removal of the considerable heat of polymerization, particularly in the gel region, controlled cooling is necessary. The polymerization temperatures are usually between about 15° C. and about 70° C. under normal pressure. In autoclaves, they are suitably about 90°-100° C. Dwell time varies between a few hours and several days, depending on the nature of the polymerization batch and the procedure.

In the interest of the most possible complete conversion (>99 percent) the temperature toward the end of the polymerization process should be raised again for a short time, for example to above 100° C., possibly to about 120° C.

Suitably, the batch is cooled slowly, whereby the polymer sheets separate from the glass plates and can be removed.

A better understanding of the present invention and of its many advantages will be had from the following specific examples, given by way of illustration.

EXAMPLE 1

A mixture of 0.05 part of 2-(2-hydroxy-5-methylphenyl)-2H-benzotriazole, 0.8 part of di-2-ethylhexyl phosphate, 0.75 part of triallyl cyanurate, 0.1 part of dimethyl-2,2'-azo-bis-isobutyrate, and 98.3 parts of methyl methacrylate are, as is usual for cast acrylic glass, filled into a silicate glass chamber whose interior walls are spaced 6 mm apart, and are polymerized for 24 hours at 40° C. The final polymerization takes place in a tempering cabinet for 6 hours at 115° C.

After cooling and removal from the mold, an almost colorless acrylic glass sheet is obtained which, even after tempering at 160° C. for purposes of shaping, scarcely alters its color.

In analogy to Example 1, copolymers were also prepared using methyl methacrylate in a range to less than 10 percent by weight with other commonly used comonomers such as methyl acrylate, ethyl acrylate and ethyl methacrylate, butyl acrylate and methacrylate, ethylhexyl acrylate and methacrylate, phenyl acrylate and methacrylate, acrylamide and methacrylamide, acrylic acid and methacrylic acid, and styrene.

Also in analogous fashion and with the same good result obtained with dimethyl-2,2'-azo-bis-isobutyrate, the homologous $C_2$–$C_8$-alkyl esters, particularly the diethyl ester, as well as di-(2-hydroxyethyl)-2,2'-azo-bis-isobutyrate, di-(2-hydroxypropyl)-2,2'-azo-bis-isobutyrate, and also 1,1'-azo-bis-4-methylcumene and 1,1'-azo-bis-4-isopropylcumene, can be used. These materials are all listed in the *Polymer Handbook, loc.cit.*, as having the desired properties described earlier for the initiators of the invention.

EXAMPLE 2

A mixture like that of Example 1, in which only the initiator dimethyl-2,2'-azo-bis-isobutyrate is replaced by 0.1 part of 2,2'-azo-bis-isobutyronitrile, after polymerization forms a clearly yellow-colored sheet, the hue of which still deepens noticeably on tempering at 160° C. Of particular interest in the context of the present invention is the use of dimethyl-2,2'-azo-bis-isobutyrate as an initiator, as it opens up a route to a particularly pure polymethyl methacrylate apt for example for special optical devices.

What is claimed is:

1. A method for making substantially colorless bulk polymerized polymethyl methacrylate which comprises initiating the bulk polymerization of methyl methacrylate with an azo initiator having a half-life of 10 hours at a temperature of 65° C.±15° C. and having the formula

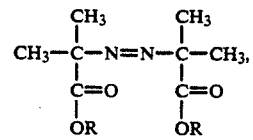

wherein R is alkyl or hydroxylalkyl having 1 to 8 carbon atoms, or is a 1,1'-azo-bis-4-alkyl cumene having 1 to 4 carbon atoms in the alkyl group.

2. A method as in claim 1 wherein R is alkyl having 1 to 8 carbon atoms.

3. A method as in claim 1 wherein a crosslinking agent selected from the group consisting of triallyl isocyanurate and triallyl cyanurate is present with said methyl methacrylate.

4. A method as in claim 1 wherein a release agent which is an acid phosphoric acid ester is present with said methyl methacrylate.

5. A method as in claim 4 wherein said acid phosphoric acid ester is di-2-ethylhexyl phosphate.

* * * * *